United States Patent
Shiba et al.

(10) Patent No.: US 6,830,415 B2
(45) Date of Patent: Dec. 14, 2004

(54) CHIP REMOVAL METHOD AND CHIP REMOVAL SYSTEM FOR NC MACHINE TOOLS

(75) Inventors: Kazuhiro Shiba, Shizuoka-ken (JP); Minoru Hamamura, Shizuoka-ken (JP); Katsuhito Endo, Shizuoka-ken (JP); Takao Date, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/263,092

(22) Filed: Oct. 3, 2002

(65) Prior Publication Data

US 2003/0066179 A1 Apr. 10, 2003

(30) Foreign Application Priority Data

Oct. 3, 2001 (JP) .................................... P2001-307815

(51) Int. Cl.[7] .............................................. B23C 9/00
(52) U.S. Cl. ...................... 409/131; 409/137; 409/141; 409/133; 409/149; 409/195; 82/901; 29/DIG. 94; 144/356; 700/177; 83/63
(58) Field of Search ................................ 409/137, 131, 409/141, 133, 147, 149, 188, 195; 408/143, 1 R; 144/252.1, 252.2, 356; 82/1.11, 901, 904; 29/DIG. 94; 451/456, 8; 83/62, 62.1, 63; 700/177

(56) References Cited

U.S. PATENT DOCUMENTS 3,665,493 A * 5/1972 Glowzewski et al. .......... 409/80
3,715,938 A * 2/1973 Ledergerber et al. ........ 82/1.11
5,170,358 A * 12/1992 Delio .......................... 700/177
6,053,886 A * 4/2000 Holland, Jr. et al. .......... 604/22
6,126,099 A * 10/2000 Fachinger et al. .......... 409/137

FOREIGN PATENT DOCUMENTS

| JP | 7-108435 | | 4/1995 |
| JP | 9-57569 | | 3/1997 |
| JP | 10-202470 A | * | 8/1998 |
| JP | 2000-94263 A | * | 4/2000 |

* cited by examiner

*Primary Examiner*—Erica Cadugan
(74) *Attorney, Agent, or Firm*—Finnegan, Henderson, Farabow, Garrett & Dunner, L.L.P.

(57) ABSTRACT

A portion (14a, 14b) of a chip remover (14) is defined to be vibratory to give an NC machine tool (MT 1) a vibration transferable onto a surface (FS) of a work (13) under a finishing by the NC machine tool (MT1), a decision is made whether the NC machine tool (MT1) enters the finishing, and vibration of the vibratory portion (14a, 14b) is controlled, as the decision is true. A chip removal method and an NC machine tool equipped with a spiral chip remover (113) as a chip remover have various chip removal rules for determining permission/prohibition of the operation of the spiral chip remover (113). This spiral chip remover (113) operates based on commands described in a machining program. When a command in the machining program is executed, the permission/prohibition of the operation of the spiral chip remover (113) is controlled according to the chip removal rules.

19 Claims, 7 Drawing Sheets

CHIP REMOVAL METHOD AND CHIP REMOVAL SYSTEM FOR NC MACHINE TOOLS

BACKGROUND OF THE INVENTION

1. Field of the Invention

The present invention relates to a chip removal method and a chip removal system, and in particular, to a chip removal method and a chip removal system for machine tools of a numerically controlled type.

2. Description of the Related Art

The machine tool is configured for machining a work, generally with a machining mechanism including a combination of a tool and a worktable for the machining, a machine frame for operatively supporting the machining mechanism, a plurality of drives for driving the machining mechanism, and a controller for quantitatively controlling the drives.

A typical machine tool adapted for a milling is equipped with a chip remover for automatically removing chips out of a machining region, without delay, as they are produced as a work is milled. The chip remover is configured with a removing mechanism for removing chips, a support frame for supporting the removing mechanism, a drive for driving the removing mechanism, and a switching element for turning the drive on and off. While running, the chip remover has faint vibrations transmitted from the drive and the removing mechanism to the support frame. The chip remover's support frame is fixed to the machine tool's machine frame, so that vibrations are transmitted from the former to the latter, as well, which however is not so serious as to give bad influences on a normal machining of the machine tool.

Machine tools in which the quantitative drive control is digitized are called "numerically controlled machine tool" (hereinafter referred to "NC machine tool"), which has a numerically controlling controller (hereinafter called "NC controller"). The NC controller is configured with a numerically controlling program (hereinafter called "NC program") adapted for calculating necessary amounts of control for drives to drive components of machining mechanism to be displaced, as necessary, and giving commands indicating the necessary control amounts, and a computer adapted to output the commands to the drives.

For the machine tool, the precision of machining is important. The machining precision of a machine tool is restricted by various errors. These are caused by internal factors such as operational conditions of and physical properties in the machine tool, and external factors such as environmental conditions about the machine tool.

For any error, whether the factor is internal or external, if a program to compensate for the influence is provided, the NC controller faithfully executes the same to calculate necessary control amount. Accordingly, the NC machine tool, allowed to have a high precision, is applicable to a work to be machined with a free surface, such as a mold.

SUMMARY OF THE INVENTION

In a process of finishing a free surface of work to a high precision with an NC machine tool provided with a chip remover, the inventors have found that vibrations accompanying removal of chips have their influences transferred on a finished surface, as a problem. Compensation for such influences of vibration might have been effected by numerical control, however with an increased complexity of NC program, as the precision of machining is increased. The present invention has been made to intrinsically avoid the problem.

It therefore is an object of the invention to provide a chip removal method and a chip removal system for NC machine tools, in which vibrations accompanying removal of chips have no influences transferred on a finished surface of work.

To achieve the object, according to an aspect of the invention, a chip removal method for NC machine tools comprises defining a portion of a chip remover vibratory to give an NC machine tool a vibration transferable onto a surface of a work under a finishing by the NC machine tool, making a decision whether the NC machine tool enters the finishing, and controlling vibration of the vibratory portion, as the decision is true.

To achieve the object, according to another aspect of the invention, a chip removal system for NC machine tools comprises a chip remover having a portion defined to be vibratory to give an NC machine tool a vibration transferable onto a surface of a work under a finishing by the NC machine tool, a decision maker making a decision whether the NC machine tool enters the finishing, and a controller controlling vibration of the vibratory portion, as the decision is true.

According to the aspects above, in the finishing of the work, the vibration transferable onto the surface of the work under the finishing is controlled, so that the problem of vibration transfer is intrinsically avoidable, without causing an associated NC program to have increased complexity, even with an increased precision for the finishing.

BRIEF DESCRIPTION OF THE ACCOMPANYING DRAWINGS

The above and additional objects, features and advantages of the invention will more fully appear when the following preferred embodiments are read in conjunction with the accompanying drawings, in which.

DETAILED DESCRIPTION OF THE PREFERRED EMBODIMENTS

Figure 1:
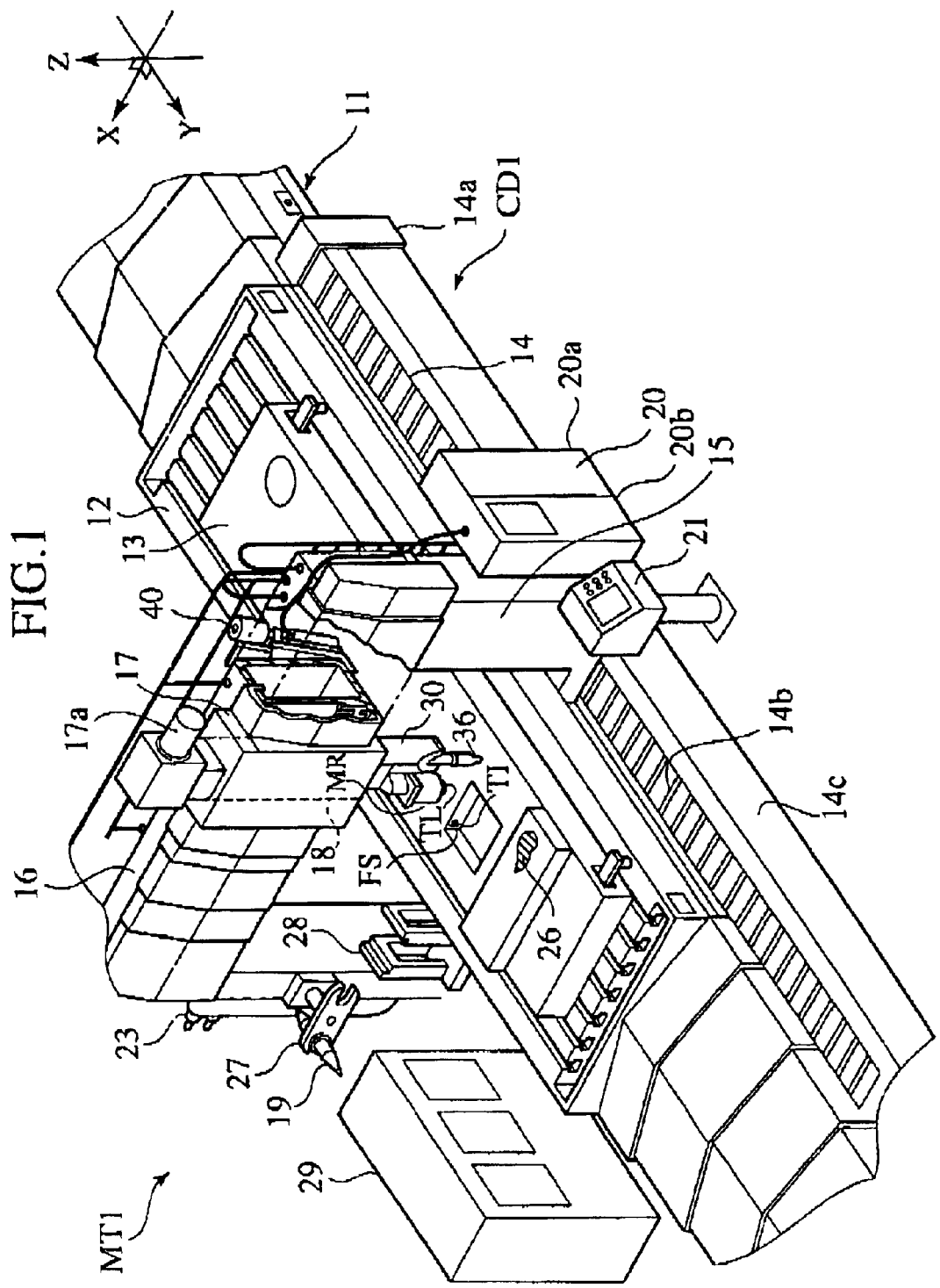
FIG. 1 is a perspective view of an NC machine tool provided with a chip removal system according to a first embodiment of the invention.

There will be detailed below the first, the modification thereof, the second, and the third preferred embodiment of the present invention with reference made to the accompanying drawings. Like members or elements are designated by like reference characters, eliminating redundant description.

(First Embodiment)

FIG. 1 shows an NC machine tool MT1 provided with a chip removal system CD1 according to the first embodiment of the invention.

The machine tool MT1 is installed on a foundation, as a combination of:

a "machine frame" including
  a long straight bed 11, and
  a gate 15 standing astride the bed 11;
"principal machinery" operatively supported by the machine frame, including
  a tool TL mounted via a ram 18 to a spindle head 17, and
  a work table 12 for carrying a work 13 fixed thereon;
"subsidiary machinery" supported by or fixed to the machine frame, including
  an automatic tool exchange system 23 provided with a tool magazine and a tool exchanger 27 for exchanging a used tool TL with a new tool 19, and
  the chip removal system CD1 which has a pair of chip removing belt conveyors 14, and a dust collector 30;
"controls" arranged on or about the machine frame, for controlling the principal and subsidiary machinery, including
  a console 21, and
  a control panel 20; and
"accessories" arranged about the machine frame to facilitate the handling of attachments (e.g. a cleaning head 36 of the dust collector 30), including
  an attachment container 29, and
  an attachment stand 28.

The machine frame has an X-Y-Z orthogonal coordinate system fixed thereto.

Mobile elements (e.g. table 12, tool TL, and attachment 36) of the principal and subsidiary machinery have their three-dimensional positions and movements component-wise defined by the X-Y-Z coordinate system. The table 12, as well as work 13 thereon, is movable along the bed 11 in a longitudinal Y-axis direction, depending on a rotation of table feed motors. An entire upside of the work 13 has lines marked thereon, whereby the work surface is divided in plan into a sequence of parallel zones, or matrix of square regions, to be observed by a pivotal CCD camera provided as part of a line sensor 40 fixed to the gate 15.

The spindle head 17, which carries the ram 18, is movable in a transverse X-axis direction along a guiding cross rail 16 on the gate 15, depending on rotation of a spindle head feed motor 17a. The ram 18 is operative to feed a spindle in a vertical Z-axis direction. This spindle is rotatable about its axis by an incorporated spindle motor. Accordingly, the tool TL set to the spindle, as well as the attachment 36 fixed thereto, is movable in both X-axis and Z-axis directions. A milling edge of the tool TL thus has a defined machining region MR, as a spatial range under the gate 15 where it is movable.

The pair of belt conveyors 14 are arranged alongside the bed 11, at both left and right, for receiving chips fallen from the table 12 or the work 13, to remove the chips out of the machining region MR, or more specifically, to transfer them in the Y-axis direction up to respective discharge ends of the conveyors 14.

At the discharge ends of conveyors 14, the chip removal system CD1 may preferably have containers provided for collecting typical or greater chips, and chip transfer pipes provided for collecting small or dusty chips.

Each conveyor 14 is configured with a drive 14a of which control is supervised from the console 21, a transfer mechanism 14b to be driven by the drive 14a for removing chips, and a support frame 14c for operatively supporting the mechanism 14b. The drive 14a includes an electric motor and a reduction gear with a clutch. The transfer mechanism 14b includes a chip removing belt, an end pulley to be driven from the motor via the reduction gear to run the belt, idle pulleys or rollers rotatable as the belt runs with an adequate tension, and bearings for rotatably supporting respective ends of pulley shafts or rollers. The support frame 14c includes a framework fixed to the foundation and fastened to the bed 11 for supporting the motor, reduction gear, and bearings, and exterior members such as skirts, rails, and garnitures fixed to the framework.

When the motor of the drive 14a is energized, rotary members of the drive 14a and the transfer mechanism 14b are caused to move or rotate, producing various vibrations, which are transmitted via the support frame 14c of the conveyor 14 to the machine frame of the machine tool MT1, and to the principal machinery, as well. As a free surface FS (e.g. corner or curved surface) of the work 13 is then milled to a specified precision by a later-described NC command "shape", transmitted vibrations have their influences TI transferred onto the milled surface SF. However, these influences FI are very fine and insignificant or neglective, if the precision is lower than an associated threshold to be defined, as will be described later, by a tolerance involved in the NC command "shape". It is noted that, in practice, insignificant influences constitute no influence. It also is noted that, unless the milling in concern is a finishing, significant influences TI, if found any, may well be removed in a subsequent finishing process.

The dust collector 30 is configured as a vacuum cleaner for removing chips 26 left on the work 13 or table 12, with the cleaning head 36 detachably attached to the ram 18. The cleaning head 36 is provided as a selective one of attachments configured with a vacuum source of which control is supervised from the console 21, a suction nozzle, and a rectangular vacuum chamber that has at a bottom corner thereof an inlet communicating with the suction nozzle, at a diagonal top corner thereof a filtering outlet communicating with the vacuum source, and at a front side thereof a pneumatically operable lid to be opened after detachment to remove chips accumulated in the chamber.

When the vacuum source is operated, the cleaning head 36 have faint vibrations, which are transmitted to the tool TL, with influences TI transferable onto a free surface FS milled to a specified precision. These influences TI also are insignificant, if the precision is lower than a later-described threshold.

The vacuum source may be a blower operatively connected to the spindle motor. The cleaning head 36 may preferably have a vacuum source separated therefrom to serve in common as a vacuum source for chip transfer pipes of the chip removal system CD1. In this case, the outlet of the vacuum chamber may preferably be connected to one of the chip transfer pipes.

Figure 2:
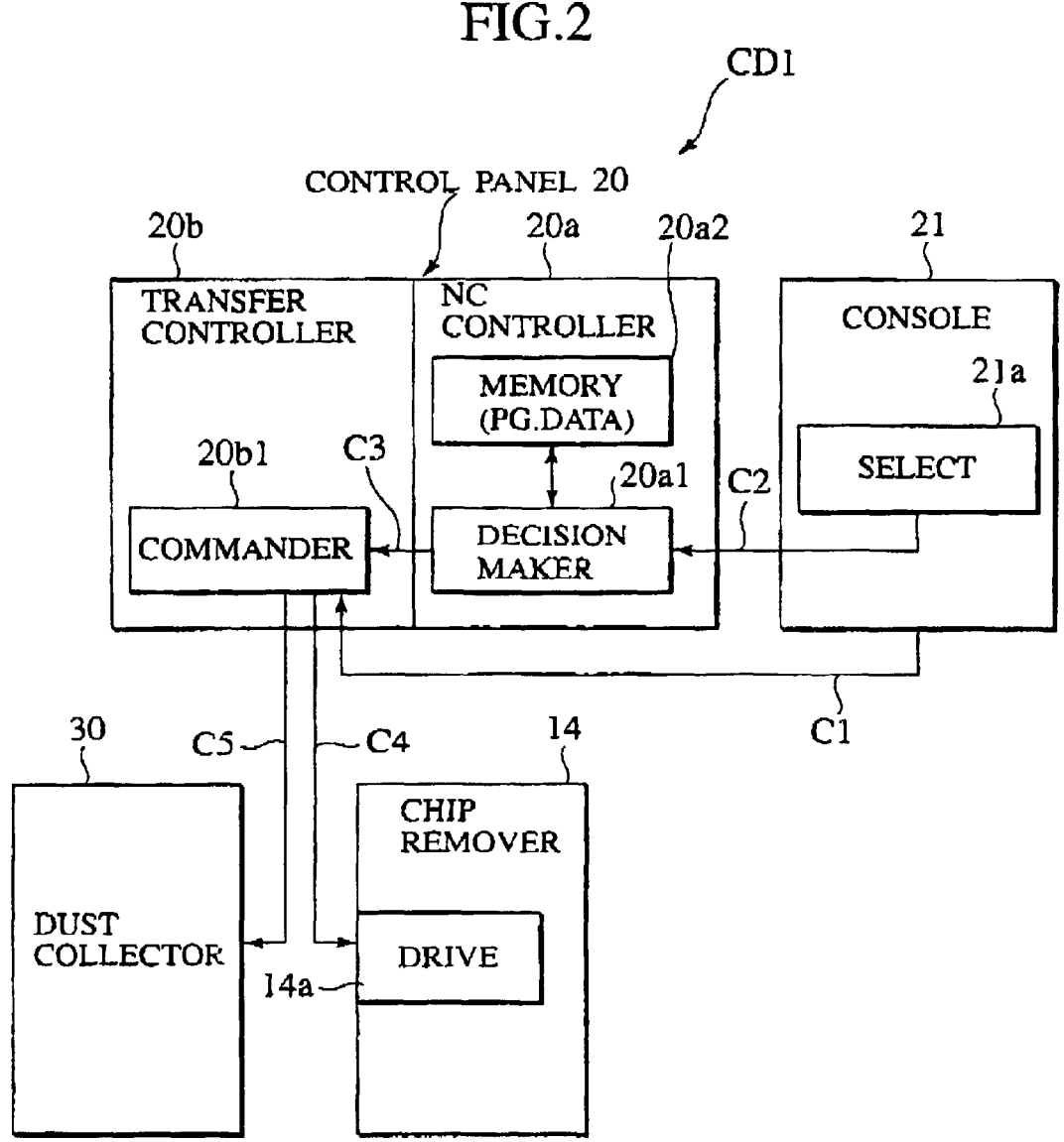
FIG. 2 is a block diagram of the chip removal system of FIG. 1.

FIG. 2 shows functional relationships among console 21, control panel 20, and chip removal system CD1.

The console 21 is governed by a supervisory operator who is authorized to supervise the entirety of machine tool MT1, including the control panel 20 and the chip removal system CD1. The console 21 is adapted to normally output a "normal mode" command C1 to the control panel 20. This command C1 permits, whether in emergency or not, the chip removal system CD1 to be manually controlled by local switches. The console 21 has a select switch 21a, which is manually operative to output a "select mode" command C2 to the control panel 20. This command C2 permits the control panel 20 to automatically control the chip removal system CD1, by way of selecting one of prescribed control modes, including a simple on-off selection as a matter of course, except for emergent cases in which the system CD1 can be stopped forcibly.

The control panel 20 is configured with a transfer controller 20b for controlling chip transfer in the chip removal system CD1 as part of the subsidiary system, and an NC controller 20a for controlling the principal machinery and the rest of the subsidiary machinery. The NC controller 20a has a memory 20a2 for storing an NC program and associated data, with necessary data for transfer control inclusive. The NC program is readable to provide a control program (FIG. 3) for decision 20a1, which is responsible for the select mode command C2 to output a transfer command C3 to the transfer controller 20b. The transfer controller 20b has a commander 20b1 responsible for the transfer command C3 from the NC controller 20a or the normal mode command C1 from the console 21 to output control commands C4 and C5 to each chip remover 14 and the dust collector 30, respectively.

Stored data in the memory 20a2 includes data on definition and data for selection of vibration control mode. The data on definition can be processed to define or identify (by an integer "j" as suffix j=1 to J, where J=3 in this case) each "vibratory portion ($vp_j$)" of the chip removal system CD1, such that $vp_1$=motor in drive 14a of each conveyor, $vp_2$=reduction gear with clutch and transfer mechanism 14b of each conveyor 14, and $Vp_3$=vacuum source of dust collector 30. The vibratory portion is vibratory, as chip remover 14 or dust collector 30 runs, with such a vibration that has a significant influence TI transferable onto a free surface SF of the work 13, when the surface SF is finished to a precision ($pr_i$: i=1 to I, where I=2 in this case) higher than an associated one of prescribed thresholds ($th_i$) such that: $th_1$ (for $pr_1$)>$th_2$ (for $pr_2$). The precision ($pr_i$) of a finishing is defined (such that $pr_i=t_k$) in terms of a tolerance ($t_k$: k>0) involved in a "shape" command to be output from the NC controller 20a2 to the principal machinery for a k-th machining to be the finishing in concern.

The selection of vibration control mode is formulated in a control mode selection table as an I×J matrix, such that:

Control Mode Selection Table for Chip Removal System CD1

|  | $vp_1$ (motor in 14a) | $vp_2$ (14b w/clutch) | $vp_3$ (v. source) |
|---|---|---|---|
| $pr_1$ (>$th_1$) | Reduce rpm | Engage clutch | Keep normal |
| $pr_2$ (>$th_2$>$th_1$) | Stop | Disengage clutch | Reduce vacuum |

If the k-th machining is programmed to follow a "shape" command involving a tolerance $t_k$ higher than the threshold $th_1$ for a high precision $pr_1$, but lower than the threshold $th_2$ for an extremely high precision $pr_2$, the transfer command C3 to be output for the k-th machining contains respective instruction ("reduce rpm" for $vp_1$, "engage clutch" for $vp_2$, and "keep normal" for $vp_3$) in the first row of the selection table. If the tolerance $t_k$ is higher than the threshold $th_2$ for extremely high precision $pr_2$, the transfer command C3 for the k-th machining contains respective instruction ("stop" for vp1, "disengage clutch" for vp2, and "reduce vacuum" for vp3) in the second row of the selection table. It is noted that the clutch may preferably be omitted from the drive 14a.

In this case, the second column (for $vp_2$) also will be omitted from the selection table.

Figure 3:
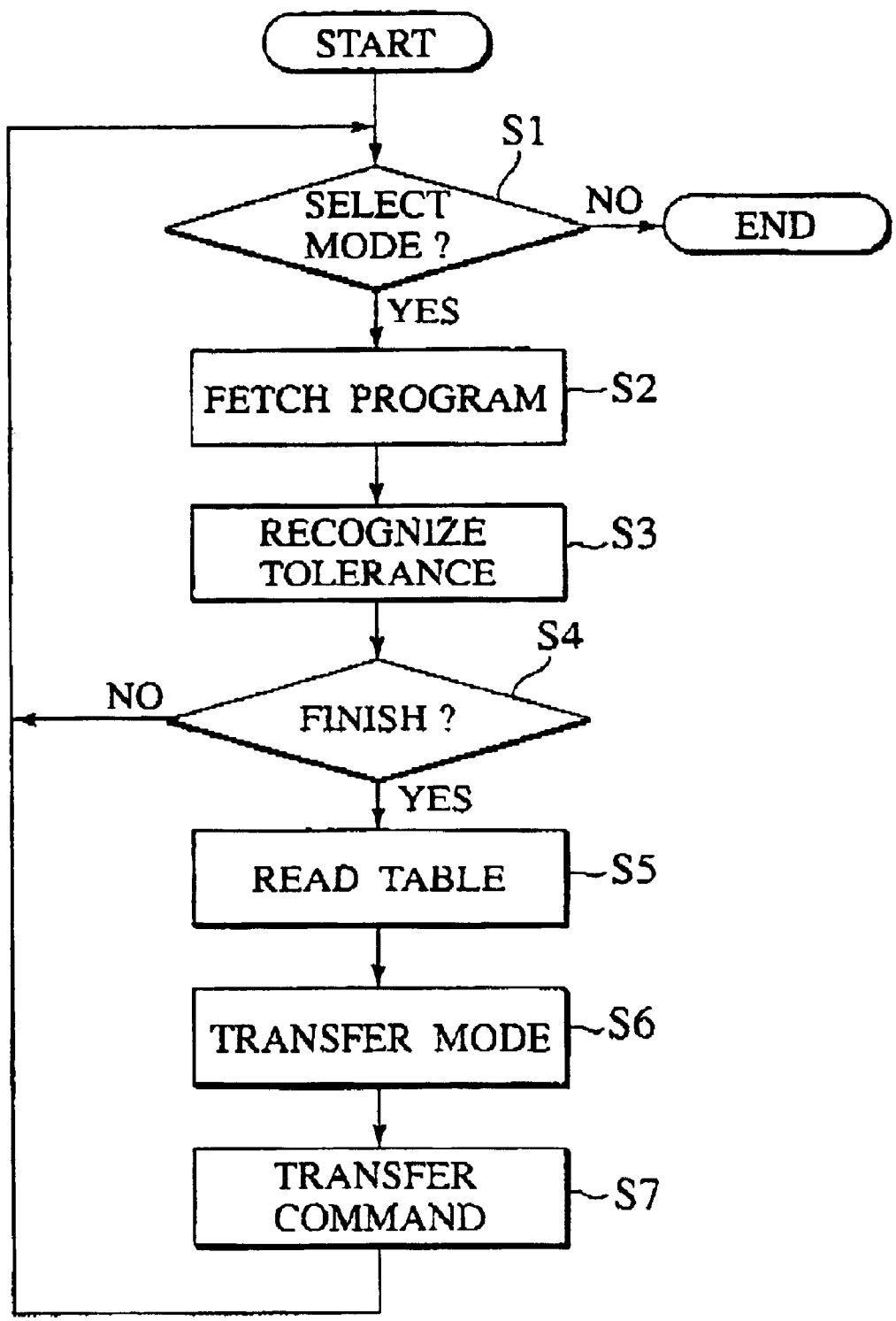
FIG. 3 is a control flow chart of the chip removal system of FIG. 1.

FIG. 3 shows how to control the chip removal system CD1 in accordance with the control program for the decision 20a1.

At a step S1 before a k-th machining, a decision is made as to whether or not the select mode command C2 is given. If the select mode command C2 is given, the control flow goes to a step S2. Unless the command C2 is given, the flow goes to an end.

At the step S2, the NC program is fetched to read the "shape" command for the k-th machining.

At a step S3, a tolerance $t_k$ involved in the "shape" command is recognized.

At a step S4, a first decision is made by comparing the recognized tolerance $t_k$ with the threshold $th_1$ for the precision $pr_1$, as to whether or not the k-th machining is such a severe finishing that the influence TI of transmitted vibration is significant. If the tolerance $t_k$ is smaller than the threshold $th_1$, the k-th machining is not concluded to be so severe, and the flow goes to the step 1, so that each chip remover 14 as well as the dust collector 30 continues running.

Unless the tolerance $t_k$ is smaller than the threshold $th_1$, the k-th machining is concluded to be a severe finishing. In this case, there is made a second decision by comparing the tolerance $t_k$ with the threshold $th_2$ for the precision $pr_2$, as to whether the precision of finishing by the k-th machining is high or extremely high. Then, the flow goes through steps S5 to S7.

At the step S5, the control mode selection table is read.

At the step S6, a transfer control mode for the chip removal system CD1 is selected on the read table. More specifically, the first or the second row of the table is selected in accordance with a result of the second decision at the step S4.

At the step S7, the selected control mode is output as the transfer command C3 from the NC controller 20a to the transfer controller 20b. As a result, corresponding control commands C5 and C4 are output from the transfer controller 20b to each chip remover 14 and the dust collector 30, whereby vibrations of the vibratory portion(s) $vp_1$, $vp_2$, and/or $vp_3$ of the chip removal system CD1 are controlled to be suppressed in accordance with the control selection table.
(Modification of the First Embodiment)

Figure 4:
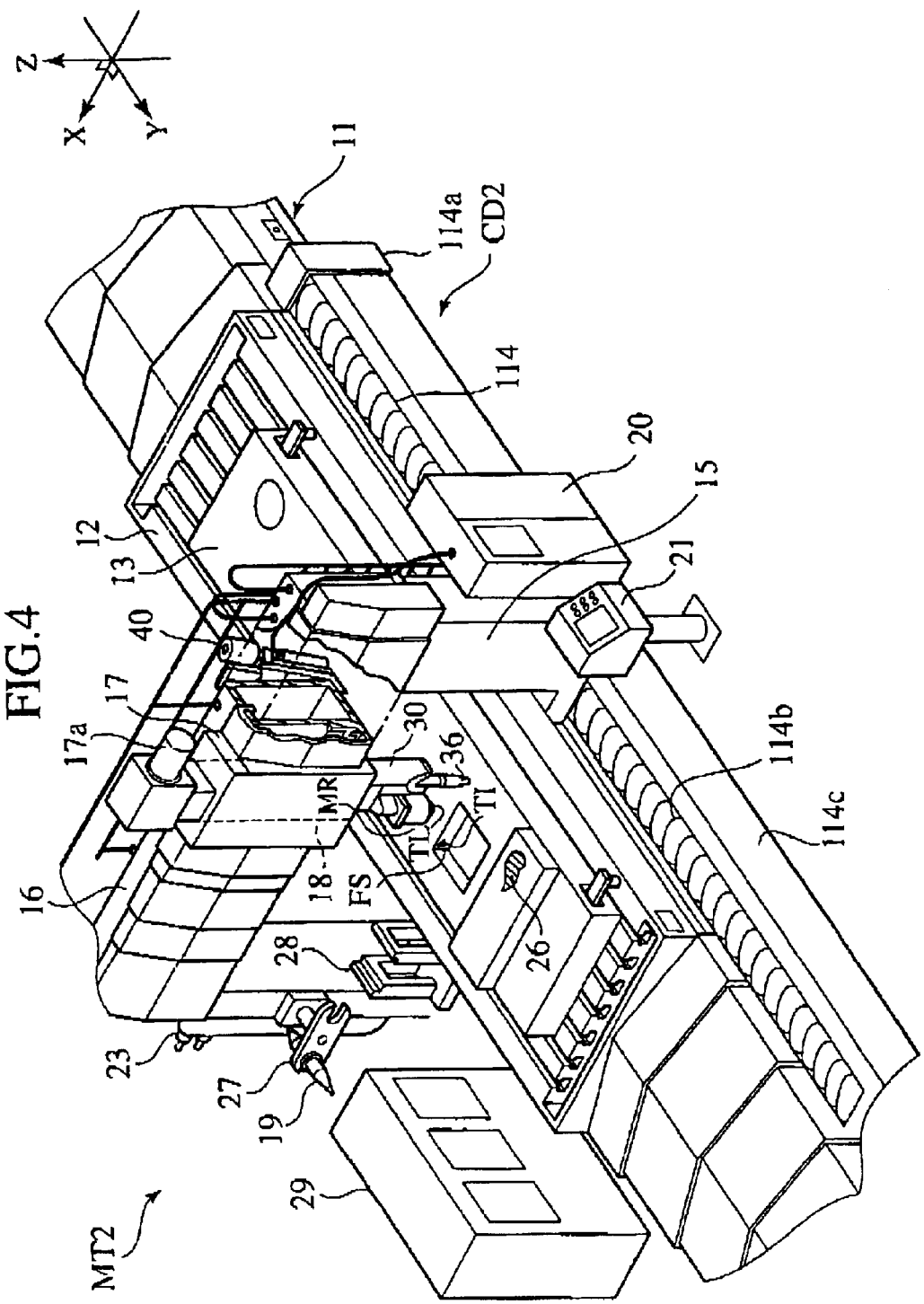
FIG. 4 is a perspective view of an NC machine tool provided with a chip removal system according to a modification of the first embodiment of the invention.

FIG. 4 shows an NC machine tool MT2 provided with a chip removal system CD2 according to a modification of the first embodiment of the invention.

This modification CD2 is different from the first embodiment CD1 in that the modification CD2 has a screw conveyor 114 installed in place of each belt conveyor 14 of the first embodiment CD1.

The screw conveyor 114 is configured with a drive 114a of which control is supervised from a console 21, a transfer mechanism 114b to be driven by the drive 114a for removing chips, and a support frame 114c for operatively supporting the mechanism 114b. The drive 114a includes an electric motor and a reduction gear with a clutch. The transfer mechanism 114b includes a chip removing long screw rotatably supported at a base end in a canti-lever manner, bearings therefor, and a long trough configured semicircular for receiving chips and arranged to extend along screw. The support frame 114c includes a framework fixed to a foundation and fastened to a bed 11 for supporting the motor, reduction gear, bearings, and trough, and exterior members such as skirts, rails, and garnitures fixed to the framework.

Accordingly, in the modification CD2, the control mode selection table is prepared by using different parameters $vp_4$ (motor in 114a) and vp$_5$ (114b with clutch) and different thresholds th$_3$ (<th$_1$) and th$_4$ (th$_1$<th$_4$<th$_2$) relative to the first embodiment CD1, while vibratory portion parameter vp$_3$ for vacuum source and precision ranks pr$_1$ and pr$_2$ are left as they are, such that:

Control Mode Selection Table for Chip Removal System CD2

|  | vp$_4$ (motor in 114a) | vp$_5$ (114b w/clutch) | vp$_3$ (v. source) |
| --- | --- | --- | --- |
| pr$_1$ (>th$_4$) | Reduce rpm | Engage clutch | Keep normal |
| pr$_2$ (>th$_4$>th$_5$) | Stop | Disengage clutch | Reduce vacuum |

It will be seen that the modification CD2 works like the first embodiment CD1. It is noted that the clutch may preferably be omitted from the drive 114a. In this case, the second column (for vp$_5$) also will be omitted from the selection table.

(Second Embodiment)

Figure 5:
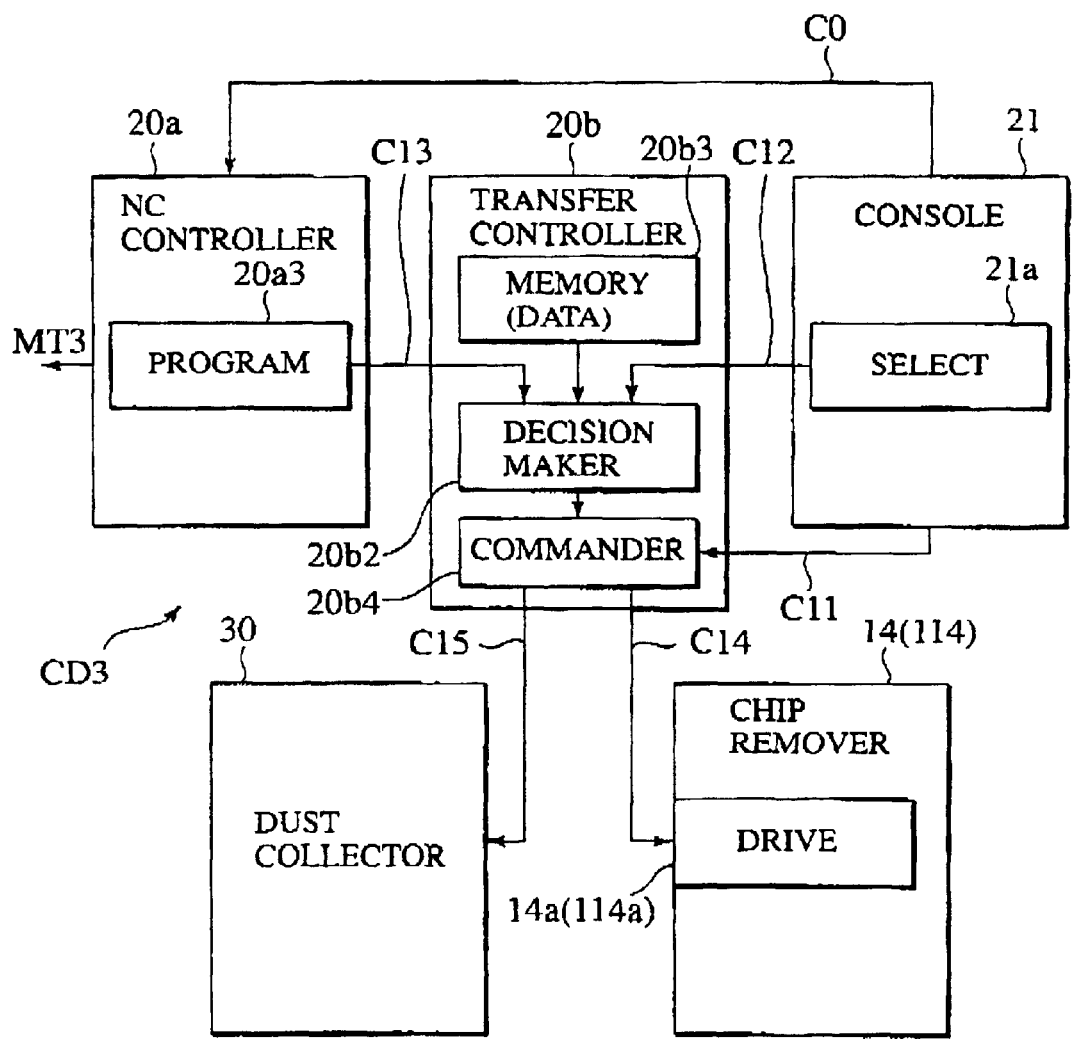
FIG. 5 is a block diagram of a chip removal system according to a second embodiment of the invention.

FIG. 5 shows a chip removal system CD3 according to the second embodiment of the invention.

The second embodiment CD3 is different from the first embodiment CD1 (FIG. 2) in that the former CD3 has a transfer controller 20b separated from an NC controller 20a, to be connected between the NC controller 20a and a console 21.

The NC controller 20a is an existing one provided with an existing NC program 20a3 for controlling an existing machine tool MT3 under necessary control commands CO from the console 21.

The console 21 also is an existing one that is modified by simple provision of an output to provide a "normal mode" command C11 to the commander 20b4, and a select switch 21a manually operative to output a "select mode" command C12 to the decision maker 20b2.

The transfer controller 20b has, besides a programmed commander 20b4, a programmed decision maker 20b2 incorporated therein to perform a vibration control corresponding to FIG. 3, and a memory 20b3 for storing program files therefor and necessary data, such as on definition and for selection of vibration control mode. It is noted that concerned instructions and files in the NC program 20a3 are read as data C13 therefrom to the decision maker 20b2.

The commander 20b4 outputs a control command C14 to a drive 14a of a chip remover 14 (which may be a drive 114a of a chip remover 114), and a control command C15 to a dust collector 30.

(Third Embodiment)

Figure 6:
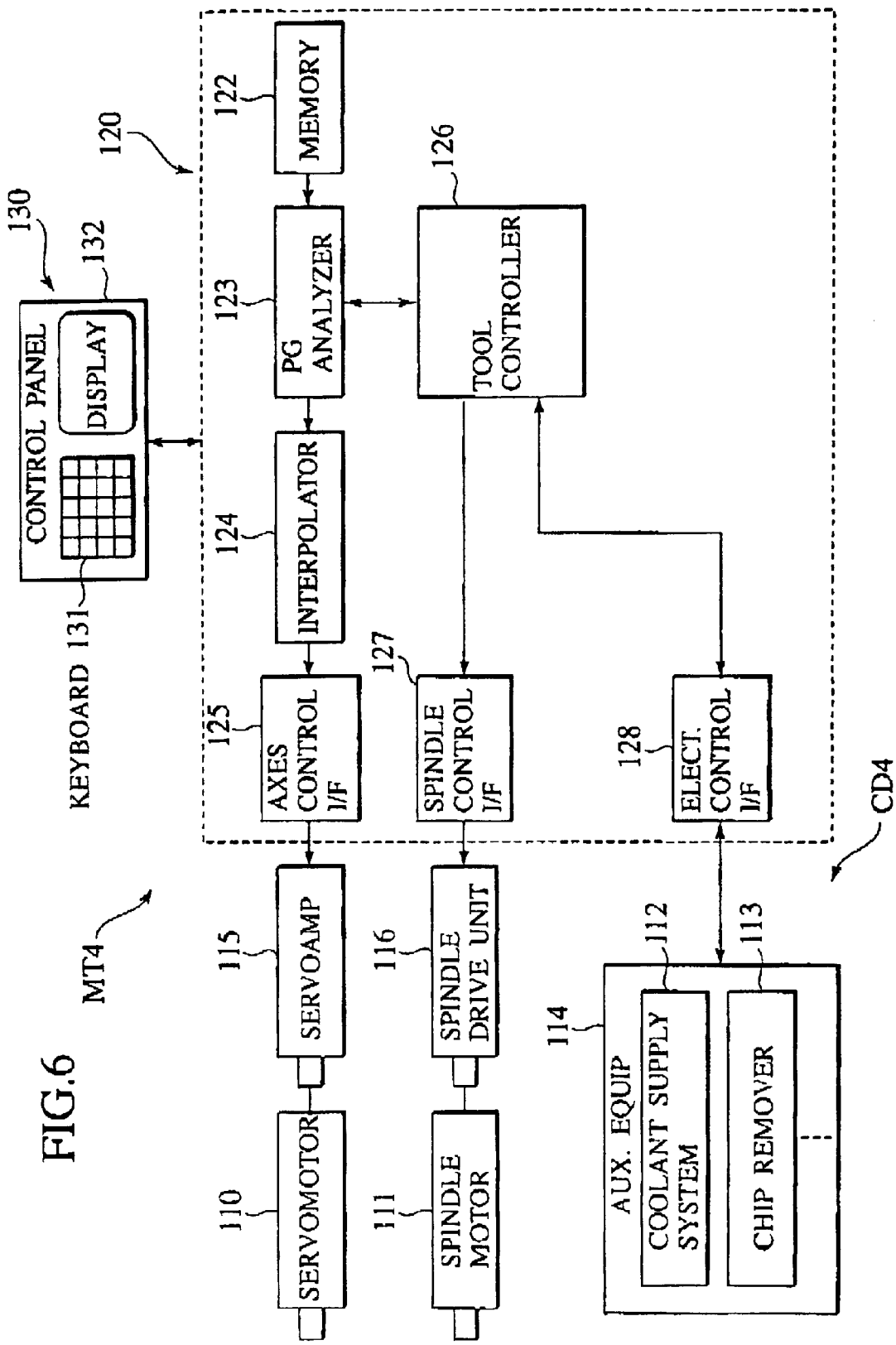
FIG. 6 is a block diagram of an NC machine tool provided with a chip removal system according to a third embodiment of the invention.

FIG. 6 shows an NC machine tool MT4 provided with a chip removal system CD4 according to the third embodiment of the invention.

The NC machine tool MT4 is controlled by an NC controller 120. The NC machine tool MT4 is configured with the NC controller 120, respective servo motors S110 for X-axis and Y-axis control, a spindle motor 111, and auxiliary equipment 114 including a coolant supply system 112, a spiral (screw type) chip remover 113, a tool exchanger, a pallet exchanger, etc.

The NC controller 120 is configured with a computer, a memory 122, a machining program analyzer 123, an interpolator 124, an axes control interface 125, a machine tool controller 126, a spindle control interface 127, and an electrical control interface 128.

The machining program analyzer 123 analyzes a machining program read from the program memory 122. The interpolator 124 performs an interpolation process of each axis based on a result of program analysis. The axes control interface 125 outputs position commands from the interpolator 124 to respective servo amplifiers 115. The machine tool controller 126 has a programmable logic controller (PLC) for performing a machining control. The spindle control interface 127 outputs signals for spindle control from the machine tool controller 126 to a spindle drive unit 116. The electrical control interface 128 outputs control signals from the machine tool controller 126 to the auxiliary equipment 114.

An operation panel 130 is connected to the NC controller 120. The operation panel 130 has an operation keyboard 131 having input keys and a display 132 such as a cathode ray tube (CRT) or a liquid crystal display (LCD).

The NC machine tool MT4 has chip removal rules defined in advance and stored in the NC controller 120. The chip removal rules define whether operation of the spiral chip remover 113 is permitted or not, or completely prohibited according to a command in a machining program. For example, the chip removal rules may be stored in the program memory 122 or in a dedicated read only memory (ROM). Because the NC controller 120 has a select mode to select the control of operation of the spiral chip remover 113 based on the chip removal rules stored in memory, the user can select and execute an operation mode at the operation panel 130.

The NC controller 120 has other modes else than the select mode, e.g. a normal operation mode and a forced stop mode. In the normal operation mode, the spiral chip remover 113 can be continuously operated, even if the time of an operation prohibition defined by the chip removal rules is set. In the forced stop mode, operation of the spiral chip remover 113 is completely prohibited. The user can select one of those operation modes at the operation panel 130.

The machining program analyzer 123 has a function of prefetching the machining program stored in the program memory 122. That is, during the select mode, the machining program analyzer 123 prefetches several blocks in the machining program, and analyzes them to know whether commands in the prefetched blocks permit or prohibit operation of the spiral chip remover 113 based on the chip removal rules defined in advance.

For example, if one of the commands in the prefetched blocks in the machining program permits an operation of the spiral chip remover 113, the machining program analyzer 123 transmits a command signal for permitting the operation of the spiral chip remover 113 to the machine tool controller 126 when this command is executed. Further, if one of the commands in the prefetched blocks in the machining program prohibits an operation of the spiral chip remover 113, the machining program analyzer 123 generates and transmits a control signal for prohibiting the operation of the spiral chip remover 113 to the machine tool controller 126 when this command is executed.

The chip removal rules provide: if the command code concerned in the machining program is a cutting command such as a G01 (linear interpolation) or G02 (circular interpolation), the operation of the spiral chip remover 113 is prohibited; and if it is a command else, such as a G00 (positioning), M00 (program stop), or M06 (tool exchange), the operation of the spiral chip remover 113 is permitted.

Figure 7:
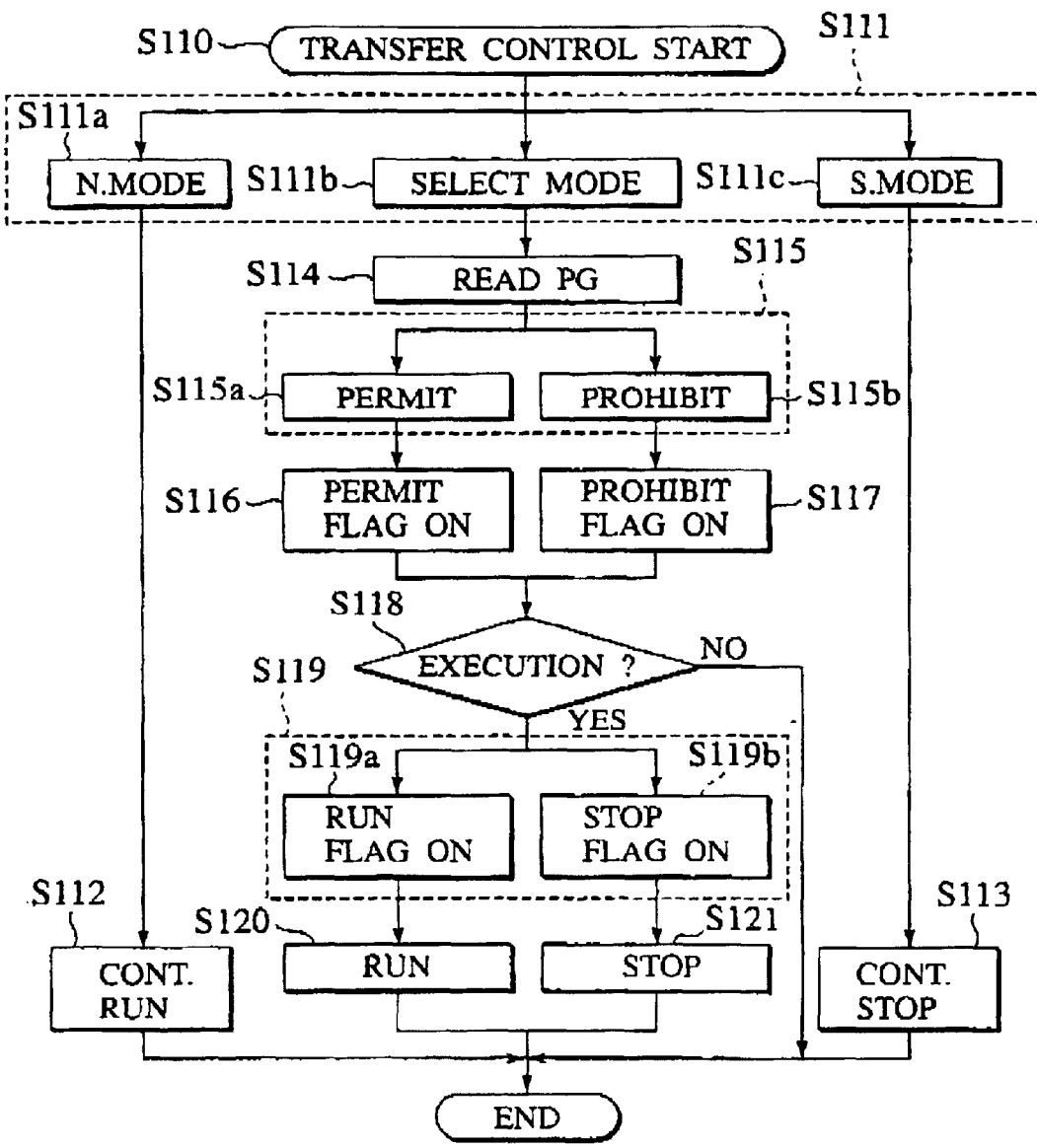
FIG. 7 is a control flow chart of the chip removal system of FIG. 6.

FIG. 7 shows how to control the spiral chip remover 113 in the NC machine tool MT4.

At a step S110, chip transfer control starts in an operation mode.

At a step S111, it is decided that the spiral chip remover 113 is in which operation mode: normal (continuous) operation mode, forced stop mode, or select mode.

In the normal operation mode (step S111a), the spiral chip remover 113 is continuously operated (step S112), free from the chip removal rules. In the normal operation mode, the spiral chip remover 113 is operated while machining, so that this mode can be alive during a heavy machining for a relatively low surface quality, where lot of chips may be produced and disposed.

In the forced stop mode (step S111c), operation of the spiral chip remover 113 is prohibited (step S113), irrespective of definitions in the chip removal rules.

In the select mode (step S111b), the machining program analyzer 123 prefetches several blocks in the machining program stored in the memory 122 (step S114). The machining program analyzer 123 decides (step S115) whether concerned command code in the fetched blocks permits or prohibits operation of the spiral chip remover 113 based on the chip removal rules defined in advance.

If the command code (e.g. G00 or G06) in the blocks permits (S115a) operation of the spiral chip remover 113, an operation permission flag is set (step S116).

On the contrary, if the command code (e.g. G01 or G02) in the blocks prohibits (S115b) operation of the spiral chip remover 113, an operation prohibition flag is set (step S117).

Upon execution of the command code at the machine tool controller 126 (step S118), a flag check is made (step S119). If the command code (e.g. G00 or G06) is not for a finishing and the operation permission flag is set (S119a), the machine tool controller 126 commands an operation of the spiral chip remover 113 via the electrical control interface 128 to the auxiliary equipment 114 (step S120).

On the other hand, if the command code (G01 or G02) is for a finishing and the operation prohibition flag is set (S119b), the machine tool controller 126 prohibits operation of the spiral chip remover 113 via the electrical control interface 128 to the auxiliary equipment 114 (step S121).

Because operation of the spiral chip remover 113 is prohibited during the finishing, it is possible to avoid decreasing the machining precision and the surface quality by the operation of the spiral chip remover 113.

The control for operation prohibition of the spiral chip remover 113 is performed before execution of the command code (e.g. G01 or G02) indicating a finishing, so that upon the finishing the operation of the spiral chip remover 113 is stopped, thereby preventing vibrations of the NC machine tool.

In this embodiment, operation of the spiral chip remover 113 is completely stopped by the command code (e.g. G01 or G02) for a finishing in the select mode. This however is not a limitation. For example, it is possible to selectively prohibit operation of the spiral chip remover 113 according to a feed speed or a machining amount in the machining program.

In the NC machine tool MT4, because operation of the chip remover is selectively controlled according to a command in the machining program, it is possible to set the operation of the chip remover as low as possible. It is therefore possible to avoid decreasing the machining precision and the surface quality due to vibrations generated by removal of chips.

It will be seen that an object of the invention is to provide a chip removal method and an NC machine tool equipped with a chip remover performing this control method, that can avoid decreasing a machining precision and a surface relative roughness of a work, by suppressing vibrations due to operation of the chip remover even when adapted for automatic removal of chips, and controlling e the frequency of operation of the chip remover as low as possible.

To achieve this object, this embodiment employs a chip removal method that, for a cutting process based on an execution of a machining program, has a step of controlling the operation of the chip remover during the execution of the machining program based on chip removal rules, that have been previously defined in advance, whether or not the operation of the chip remover is performed or prohibited according to a command described in the machining program.

Further, in the chip removal method for NC machine, the machining program is prefetched. It is then decided based on the chip removal rules whether the command described in the machining program prefetched permits or prohibits operation of the chip remover. The operation of the chip remover is permitted during execution of the command when the command in the machining program prefetched permits the operation of the chip remover. The operation of the chip remover is prohibited during execution of the command when the command in the machining program prefetched prohibits the operation of the chip remover.

In addition, in the chip removal method for NC machine tool, the chip removal rules are defined so that operation of the chip remover is prohibited in a cutting command to perform the cutting process, and the operation of the chip remover is permitted in commands other than the cutting command. During execution of the cutting command the operation of the chip remover is enters a halt state.

Still further, in the chip removal method for NC machine tool, the chip removal rules includes a normal operation mode for permitting the operation of the chip remover even in the operation prohibition mode defined in the chip removal rules, and the user can select the normal operation mode.

Further, to achieve the object, there is provided an NC machine tool that performs a cutting process based on an execution of a machining program, which is equipped with a chip remover for removing chips generated by the execution of the cutting process. The NC machine tool has a memory for storing chip removal rules defined in advance whether an operation of the chip remover is permitted or prohibited based on a command described in the machining program, and a controller for controlling the operation of the chip remover according to the chip removal rules stored in advance in the memory during the execution of the machining program.

In addition, in the NC machine tool, the controller is configured with an analysis processor prefetching the machining program and judging whether the command described in the machining program permits or prohibits the operation of the chip remover based on the chip removal rules. In the NC machine tool, when the command in the machining program prefetched permits the operation of the chip remover, the controller permits the operation of the chip remover during the execution of the command. When the command in the machining program prefetched prohibits the operation of the chip remover, the controller prohibits the operation of the chip remover during the execution of the command.

Still further, in the NC machine tool, the chip removal rules are defined so that the operation of the chip remover is prohibited in a cutting command to perform the cutting process, and operation of the chip remover is permitted in commands other than the cutting command. During execution of the cutting command, the operation of the chip remover enters a halt state.

Moreover, in the NC machine tool, the chip removal rules includes a normal operation mode for permitting the operation of the chip remover even in the operation prohibition mode defined in the chip removal rules. The user can select the normal operation mode.

This application is based upon and claims the benefit of priority from the prior Japanese Patent Application No.P2001-307815, filed on Oct. 3, 2001, the entire contents of which are incorporated herein by reference.

All these and other modifications and alterations of the illustrated embodiments within the common knowledge of the specialists are intended in the foregoing disclosure. It is therefore appropriate that the invention be construed broadly and in a manner consistent with the fair meaning or proper scope of the subjoined claims.

What is claimed is:

1. A chip removal method for NC machine tools, comprising:
    operating a vibratory portion of a chip remover of the NC machine tool during machining of a work-piece, wherein the vibratory portion vibrates the NC machine tool;
    comparing a dimensional tolerance value for the work-piece to a prescribed tolerance threshold level;
    determining when the NC machine tool enters a finishing stage of the machining of the work-piece based on the compared tolerances; and
    changing the vibration of the vibratory portion when the NC machine tool enters the finishing stage.

2. A chip removal method according to claim 1, wherein changing the vibration comprises stopping the vibratory portion.

3. A chip removal method according to claim 1, wherein the vibratory portion of the chip remover comprises a rotary portion, and changing the vibration comprises changing a rotation speed of the rotary portion.

4. A chip removal method according to claim 1, wherein the vibratory portion of the chip remover comprises a belt conveyor configured to transfer chips.

5. A chip removal method according to claim 1, wherein the vibratory portion of the chip remover comprises a screw conveyor configured to transfer chips.

6. A chip removal system for an NC machine tool, comprising:
    a chip remover having a vibratory portion that vibrates the NC machine tool during machining of a work-piece;
    a decision maker configured to compare a tolerance value for the work-piece to a prescribed tolerance threshold level to determine when the NC machine tool enters a finishing stage of the machining of the work-piece; and
    a controller configured to control the vibratory portion to change the vibration of the vibratory portion when the NC machine tool enters the finishing stage.

7. A chip removal system according to claim 6, wherein the controller is configured to stop the vibratory portion to change the vibration.

8. A chip removal system according to claim 6, wherein the vibratory portion of the chip remover comprises a rotary portion, and the controller is configured to change a rotation speed of the rotary portion to change the vibration.

9. A chip removal system according to claim 6, wherein the vibratory portion of the chip remover comprises a belt conveyor configured to transfer chips.

10. A chip removal system according to claim 6, wherein the vibratory portion of the chip remover comprises a screw conveyor configured to transfer chips.

11. The chip removal system of claim 6, wherein the prescribed tolerance threshold is a first and a second threshold, and wherein the controller is configured to change the vibration level of the vibratory portion by reducing, but not stopping, a speed of the vibratory portion when the value of the work-piece tolerance is above the first threshold and wherein the controller is configured to stop the vibratory portion to stop the vibration when the value of the work-piece tolerance is above the second threshold.

12. A chip removal method for an NC machine tool, equipped with a chip remover for removing chips generated in a culling process, which performs the culling process based on an execution of blocks in a machining program, comprising the step of:
    storing chip removal rules that define whether operation of the chip remover is permitted or prohibited during the execution of the blocks of the machining program, based on a command described in the blocks to compare a dimensional tolerance value for the work-piece to a prescribed tolerance threshold level; and
    controlling the operation of the chip remover during the execution of the blocks of the machining program based on the stored chip removal rules according to the command.

13. The chip removal method for an NC machine tool according to claim 12, further comprising:
    prefetching the machining program,
    determining based on the chip removal rules whether the command described in the blocks of the machining program permits or prohibits the operation of the chip remover,
    permitting the operation of the chip remover during the execution of the command when the command in the blocks indicates to permit the operation of the chip remover, and prohibiting the operation of the chip remover during the execution of the command when the command in the blocks indicates to prohibit the operation of the chip remover.

14. The chip removal method for an NC machine tool according to claim 12, wherein
    the chip removal rules are defined so that the operation of the chip remover is prohibited in a cutting command to perform the cutting process, and the operation of the chip remover is permitted in commands other than the cutting command, and
    during the execution of the cutting command the operation of the chip remover is stopped.

15. The chip removal method for an NC machine tool according to claim 12, wherein the chip removal rules permit the operation of the chip remover even if it is in an operation prohibition mode defined in the chip removal rules.

16. An NC machine tool configured to execute blocks of a machining program to perform a cutting process, the NC machine tool being equipped with a chip remover for removing chips generated during the cutting process, the NC machine tool comprising:
    a memory configured to store chip removal rules defining whether operation of the chip remover is permitted or prohibited during execution of the blocks of the machining program, based on a command described in the blocks to compare a dimensional tolerance value for the work-piece to a prescribed tolerance threshold level; and
    a controller configured to control the operation of the chip remover according to the chip removal rules based on the command during the execution of the blocks of the machining program.

17. The NC machine tool according to claim 16, wherein
the controller comprises an analysis processor configured to prefetch the machining program and judge whether the command described in the machining program permits or prohibits the operation of the chip remover based on the chip removal rules,
wherein the controller is configured so that when the command in the blocks of the machining program permits the operation of the chip remover, the controller is configured to permit the operation of the chip remover during the execution of the command, and
when the command in the blocks of the machining program prohibits the operation of the chip remover, the controller is configured to prohibit the operation of the chip remover during the execution of the command.

18. The NC machine tool according to claim 16, wherein
the chip removal rules are defined so that the operation of the chip remover is prohibited in a cutting command, and the operation of the chip remover is permitted in commands other than the culling command, and the chip removal rules are configured so that during the execution of the culling command, the operation of the chip remover is stopped.

19. The NC machine tool according to claim 16, wherein
the chip removal rules include a normal operation mode that permits the operation of the chip remover when the NC machine tool is in an operation prohibition mode.

* * * * *

UNITED STATES PATENT AND TRADEMARK OFFICE
CERTIFICATE OF CORRECTION

PATENT NO. : 6,830,415 B2  Page 1 of 1
DATED : December 14, 2004
INVENTOR(S) : Kazuhiro Shiba et al.

It is certified that error appears in the above-identified patent and that said Letters Patent is hereby corrected as shown below:

Title page,
Item [57], ABSTRACT,
Line 2, "(MT 1)" should read -- (MT1) --

Column 12,
Line 10, "culling" should read -- cutting -- (both occurrences).

Column 14,
Lines 5 and 7, "culling" should read -- cutting --.

Signed and Sealed this

Tenth Day of May, 2005

JON W. DUDAS
*Director of the United States Patent and Trademark Office*